United States Patent [19]
Wada

[11] 4,181,013
[45] Jan. 1, 1980

[54] ELECTRODES FOR AN ELECTROMAGNETIC FLOW METER

[75] Inventor: Norikazu Wada, Ichihara, Japan
[73] Assignee: Honeywell Inc., Minneapolis, Minn.
[21] Appl. No.: 832,872
[22] Filed: Sep. 13, 1977

[30] Foreign Application Priority Data

Jul. 23, 1976 [JP] Japan ............................ 51-97534[U]

[51] Int. Cl.² ............................................. G01F 1/58
[52] U.S. Cl. ............................................ 73/194 EM
[58] Field of Search ................... 73/194 EM; 310/11

[56] References Cited

U.S. PATENT DOCUMENTS

| | | | |
|---|---|---|---|
| 2,215,213 | 9/1940 | Ellis | 204/195 R X |
| 2,733,604 | 2/1956 | Coulter | 73/194 EM |
| 3,397,575 | 8/1968 | Ham | 73/194 EM |
| 3,882,011 | 5/1975 | Hines et al. | 204/195 R |

FOREIGN PATENT DOCUMENTS

1111981  5/1968  United Kingdom ............... 73/194 EM

Primary Examiner—Charles A. Ruehl
Attorney, Agent, or Firm—Laurence J. Marhoefer; Lockwood D. Burton; Mitchell J. Halista

[57] ABSTRACT

Electrodes for an electromagnetic flow meter are mounted through a pipe wall using pairs of concentric electrodes electrically insulated from each other and from the mounting pipeline while electrically contacting a fluid in the pipeline being measured for flow rate. The electrode pairs are held on the pipeline wall on a line intersecting the fluid flow at a right angle and are electrically connected to supply signals induced by the fluid flow to a measuring circuit. The concentric electrode structure provides two electrode pairs at each electrode site on the pipeline wall.

8 Claims, 8 Drawing Figures

ELECTRODES FOR AN ELECTROMAGNETIC FLOW METER

BACKGROUND OF THE INVENTION

1. Field of the Invention

The present invention relates to electromagnetic flow meters. More specifically, the present invention is directed to electrodes for electromagnetic flow meters.

2. Description of the Prior Art

The well-known electromagnetic flow meter is an instrument in which there is provided a magnetic field at a right angle through a fluid flow in a pipeline and also there are provided electrodes contacting the pipeline fluid for detecting flow quantity. The electrodes are located facing each other across the flow passing through said magnetic field and are intersecting the flow direction and the magnetic field at a right angle. The flow quantity can be determined by measuring an electromotive force that is generated between the electrodes in proportion to the average flow quantity. In the electromagnetic flow meter of this kind, the following prior art structure has been used in order to increase the level of the detected electromotive force between said electrodes without increasing the intensity of the magnetic field. Namely, according to the prior art structure, there are provided a plurality of pairs of rod type electrodes which are arranged along the wall of a fluid flow carrying pipe so as to make a straight line along the axis of said pipe. Further, the electromotive forces generated between respective electrode pairs are summed to increase the total level of the electromotive force. According to the electrode arrangement like that, however, there occur the disadvantages that more pipeline sites are needed for installing the electrodes, that more pipeline area is required for installing the electrodes, that the size of the flow meter becomes larger, that the number of parts of the flow meter is increased, and so forth. Accordingly, it is desirable to provide an electrode structure for providing an increase in the detected flow signal while avoiding the aforesaid disadvantages of the prior art.

SUMMARY OF THE INVENTION

An object of the present invention is to provide an improved electrode structure for an electromagnetic flow meter.

In accomplishing these and other objects, there has been provided in accordance with the present invention, an electrode structure for an electromagnetic flow meter having a pair of coaxial electrodes, insulating means electrically isolating the pair of electrodes from each other and clamping means for clamping the coaxial electrodes and the insulating means together. The electrode structure further includes mounting means for mounting the electrode structure through a pipeline wall in electrical contact with a fluid carried by the pipeline.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
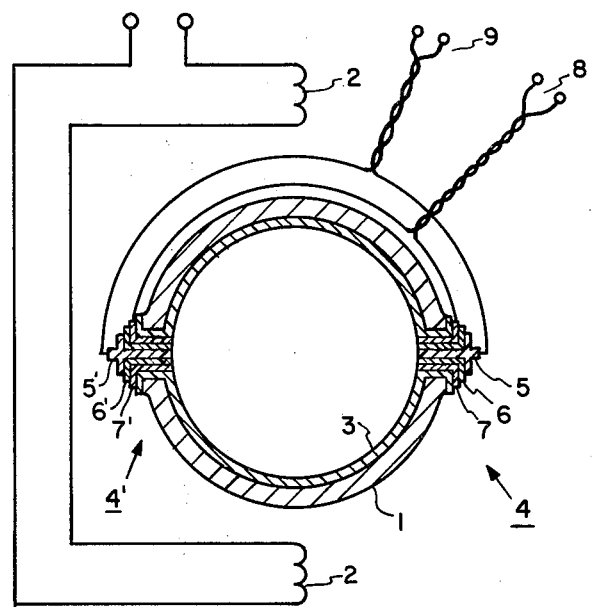
FIG. 1 is a diagrammatical representation of the electromagnetic flow meter embodying this invention, FIG. 2 a magnified cross-sectional view of a part of an outside mounting type electrode assembly according to this invention.

FIG. 1 is a cross-sectional view of an electromagnetic flow meter according to this device. In FIG. 1, a reference numeral 1 designates a wall of a pipe for guiding fluid to be measured which is made to a non-magnetic material like a suitable type of stainless steel. Reference numeral 2 designates an excitation coil for generating a magnetic field which is arranged to intersect the longitudinal axis of the pipe 1, i.e., the flow direction of the pipe fluid, at a right angle. Reference numeral 3 designates a lining coated on the inside wall of the pipe 1 for the purpose of electrical insulation. An electrode assembly 4 according to the present invention includes an inner electrode 5, an insulation spacer 6 and an outer electrode 7. These inner and outer electrodes 5 and 7 are held in a coaxial relation via the insulating spacer 6. A similar complex electrode assembly 4' located on the opposite side of the pipe 2 from the electrode assembly 4 comprises an inner electrode 5', an insulating spacer 6' and an outer electrode 7', and these three constituents are also held in coaxial relation. Inner electrodes 5 and 5', and outer electrodes 7 and 7' constitute opposing electrode pairs, respectively, and are connected to output terminals 8 and 9, respectively. Electromotive forces generated between these electrode pairs are, thus, applied to the terminals 8 and 9 in proportion to the average flow quantity in the pipe 2.

Figure 2:
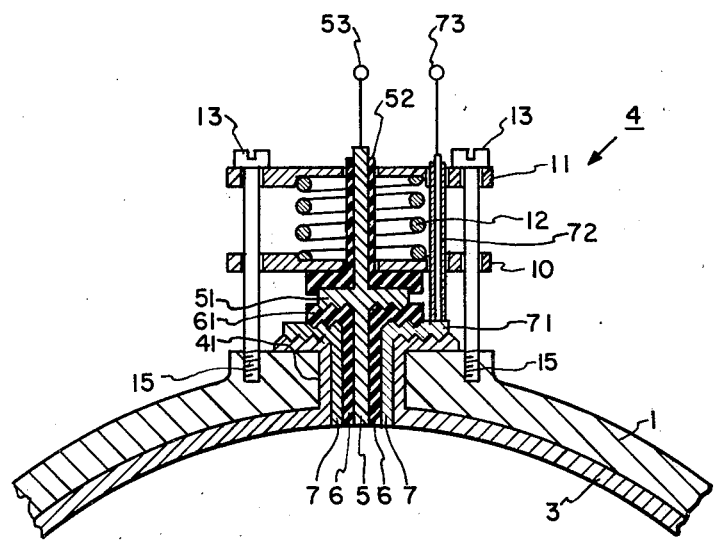

FIG. 2 is a magnified cross-sectional view of one of the electrode assemblies 4, 4' to show the details thereof. In FIG. 2, an insulating lining 3 applied to the inner surface of the pipe wall 1 extends along the inner surface of a hole 41 in the pipe wall 1. The hole 41 is formed in the pipe wall 1 so as to receive tightly the assembly 4, and extends from the inside surface to the outside surface of the pipe wall 1. A hollow cylindrical outer electrode 7 is tightly inserted into the hole 41 in contact with the line 3. One end of this outer electrode 7 is preferably flush with the lining 3 while being exposed to the inside of the pipe. The other end of the same has a radially outwardly extending collar 71, from which a connecting electrically conductive rod 72 having an insulating coating on its outer surface periphery is extended outwardly from the pipe wall 1 upwardly. The connecting rod 72 has an electrical connection terminal 73 at its free end.

The insulating spacer 6 in the form of a hollow cylinder or tube is inserted into the hollow center portion of the outer electrode 7 with an inner end also flush with the insulating lining 3. Similarly, the cylindrical center or inner electrode 5 is inserted into the hollow center portion of the insulating tube 6 with one end flush with the lining 3. This inner electrode 5 has a radially outwardly extending collar 51 at its center portion. An upper or outward portion of the electrode 5 extending past the collar 51 has an insulating coating 52 formed around its outer periphery while the electrode 5 extends further to an electrical connection terminal 53. A radially outwardly extending collar 61 is formed at the outer end of the insulating tube 6 to insulate the collar 71 of the outer electrode 7 from the collar 51 of the inner electrode 5. The insulating coating 52 covering the upper or outward portion of said inner electrode 5 is extended to also cover the outer surface of the collar 51.

The electrode group or assembly as arranged above is fluid-tight installed on the pipe 1 by means of a lower or inner plate 10, an upper or outer plate 11, a spring 12 disposed therebetween and threaded bolts 13 for fastening those together. Specifically, the lower and upper plates 10, 11 are similar elements each having a center hole for allowing the center electrode 5 and the insulating coating 52 to extend therethrough. A radially displaced hole in each of the plates 10 and 11 allows the rod 72 and its insulating coating to extend therethrough when the radially displaced holes are aligned. Finally, each of the plates 10 and 11 have peripheral holes extending therethrough to allow the shanks of the bolts 13 to extend therethrough. The threaded bolts are arranged to thread into threaded holes 15 in the pipe wall 1. Thus, the assembled layered structure having the plates 10 and 11 and the spring 12 therebetween is held on the pipe wall 1 by the bolts 13. The spring 12 is arranged to be concentric with the center electrode 5 whereby it is effective to transmit a pressure from the outer plate 11 produced by the bolt heads of the bolts 13 bearing on the outer plate 11 to the inner plate 10. The inner plate 10, in turn, exerts a pressure on the collars 51, 61 and 71 through the insulating coating 52 to hold the electrode assembly against the insulating lining 3 on the pipe wall 1 to assure a fluid-tight connection. Concurrently, the electrodes 5 and 7 are electrically insulated from each other and the pipe wall 1.

Figure 3:
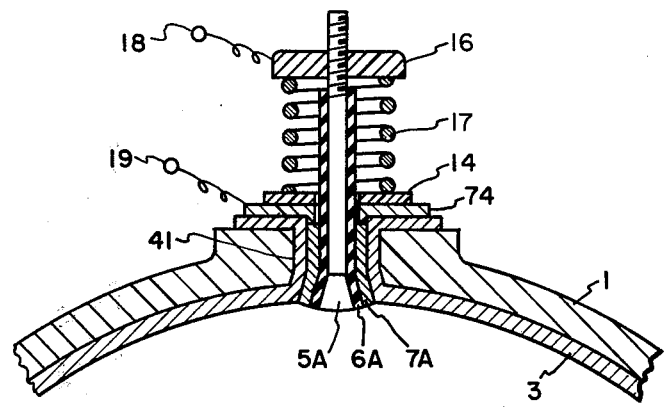
FIG. 3 a cross-sectional view of a part of an inside mounting type electrode assembly according to this invention.

The electrode assembly as shown in FIG. 2 is a so-called outside mounting type electrode which is installed on the outside of the pipe wall 1. However, the present invention is not limited to this type but is also applicable to a so-called inside mounting type. FIG. 3 is a magnified cross-sectional view of an inside mounting type electrode structure according to the present invention. In FIG. 3, a hollow cylindrical outer electrode 7A without an outwardly extending collar is inserted from the inside of the pipe wall 1 into the hole 41 having an insulating lining 3 on its inside wall. A tubular electrically insulating member 6A is inserted into the hollow center of the electrode 7A and extends into the inner end of the electrode 7A to a point past the outer end of the electrode 7A. Then an inner electrode 5A is inserted through the hollow portion of the insulating member 6A. An insulating washer 14 is mounted on a wedge ring 74 which has a ridge contact with the upper or outer end of the outer electrode 7A. The outer end of the center electrode 5A is threaded to accept a flattened nut 16. An concentric spring 17 is positioned around the electrode 5A between the nut 16 and the washer 14 while being electrically insulated from the electrode 5A by the tube 6A and from the wedge ring 74 by the electrically insulating washer 14. The head of the electrode 5A is tapered to urge the adjacent ends of the tube 6A and the electrode 7A against the insulating lining 3 when the electrode 5A is pulled into the hole 41 by spring 17 and nut 16. The resulting layered combination may form a substantially smooth transition surface across the hole 41 although the flush surface state with the lining 3 exhibited by the outer electrode assembly of FIG. 2 may not be achieved. However, when the spring 17 sandwiched between the washer 14 and nut 16 is compressed by tightening the nut 16, the electrode assembly of FIG. 3 can thus be mounted fluid-tight on the wall of the pipe 1. Electrical connections 18, 19 may be made by any convenient technique to the electrodes 5A and 7A, respectively, to provide electrical signal paths thereto.

In examples of the present invention explained hereunto, the electrode assembly comprises the outer and inner electrodes, e.g., electrodes 5 and 7. However, the present invention is not limited to the case of a two electrodes structure but is also capable of being extended to a greater number of electrodes, e.g., a coaxial three electrodes structure, when it is needed.

Figure 4:
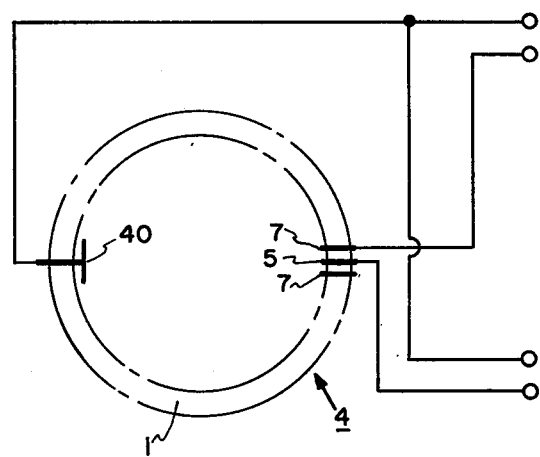
FIG. 4 illustrates another example of an electromagnetic flow meter according to the present invention.

The foregoing explanation has also been made in connection with the case wherein the coaxial electrode assemblies include two similar electrode assemblies located in the pipe wall 1 opposite each other and having a substantially identical structure to each other. However, it should be noted that the present invention is not limited thereto. That is, as shown in FIG. 4, it is possible to constitute a pair of electrodes by means of the electrode assembly 4 located in pipe wall 1 and including the inner electrode 5 and the outer electrode 7 in coaxial relation to form one of the pair of electrodes and a single conventional electrode 40 located in the pipe wall 1 and having a large area as the other of the pair of electrodes.

As discussed above, according to the present invention, at least one of opposing electrodes are constituted with the coaxially arranged electrode assembly. Therefore, it is possible to establish a small electromagnetic flow meter wherein the number of parts is decreased and a larger electromotive force can be obtained without increasing the number of electrode sites and the area for electrode installation. Further, according to the present invention, a plurality of electrode pairs are arranged coaxially in the small area, so that respective electrodes can measure the flow quantity under a uniform magnetic field whereby errors among the electrodes are minimized.

Accordingly, it may be seen that there has been provided, in accordance with the present invention, an improved electrode assembly for an electromagnetic flow meter.

The embodiments of the invention in which an exclusive property or privilege is claimed are defined as follows:

1. An electrode structure comprising
   a center electrode,
   an electrically insulating tube surrounding a portion of said center electrode,
   an outer electrode surrounding a portion of said tube and
   clamping means for compressing said center electrode and outer electrodes against said insulating tube wherein said center electrode includes a first radially outwardly extending collar, said outer electrode includes a second radially outwardly extending collar and said tube includes a third radially outwardly extending collar located between said first and second collars and said clamping means is arranged to urge said first and second collars against said third collar.

2. An electrode structure as set forth in claim 1 and further including means for mounting said electrode structure through a pipeline wall whereby said center and outer electrodes are in electrical contact with a fluid carried by said pipeline and electrically insulated from the pipeline wall.

3. An electrode structure as set forth in claim 2, and further including first electrical connection means for providing an electrical connection to said center electrode and second electrical connection means for providing an electrical connection to said outer electrode.

4. An electrode structure as set forth in claim 1 and further including means for mounting said electrode structure through a pipeline wall whereby said center and outer electrodes are in electrical contact with a fluid carried by said pipeline and electrically insulated from the pipeline wall, said mounting means including spring means to further urge said second collar against an electrically insulated pipeline wall.

5. An electrode structure as set forth in claim 1 and further including first electrical connection means for providing an electrical connection to said center electrode and second electrical connection means for providing an electrical connection to said outer electrode.

6. In an electromagnetic flow meter including a pipe for guiding fluid, a magnetic field generator for generating a magnetic field which intersects the fluid flow direction at a right angle and fluid contacting electrodes facing each other across the pipe in such a manner that a center line combining them intersects the flow direction and the magnetic field at a right angle, characterized in that at least one of the fluid contacting electrodes is an electrode assembly having a plurality of coaxial electrodes and electrically insulating means electrically isolating said plurality of electrodes from each other, said electrode assembly including
a center electrode,
an electrically insulating tube surrounding a portion of said center electrode,
an outer electrode surrounding a portion of said tube and
clamping means for compressing said center and outer electrodes against said insulating tube,
wherein said center electrode includes a first radially outwardly extending collar, said outer electrode includes a second radially outwardly extending collar and said tube includes a third radially outwardly entending collar clamped between said first and second collars and said clamping means is arranged to urge said first and second collars against said third collar.

7. In an electromagnetic flow meter as set forth in claim 6, and further including means for mounting said electrode structure through a pipeline wall whereby said center and outer electrodes are in electrical contact with a fluid carried by said pipeline and electrically insulated from the pipeline wall.

8. In an electromagnetic flow meter as set forth in claim 6 and further including first electrical connection means for providing an electrical connection to said center electrode and second electrical connection means for providing an electrical connection to said outer electrode.

* * * * *